US009605895B2

(12) United States Patent
Sugawara et al.

(10) Patent No.: US 9,605,895 B2
(45) Date of Patent: Mar. 28, 2017

(54) METHOD AND APPARATUS FOR PRODUCING HIGH-PURITY LIQUEFIED CARBON DIOXIDE

(75) Inventors: Hiroshi Sugawara, Tokyo (JP); Yoshinori Ono, Tokyo (JP); Shingo Tanaka, Kawasaki (JP); Takaki Nasu, Kawasaki (JP)

(73) Assignees: ORGANO CORPORATION, Tokyo (JP); SHOWA DENKO GAS PRODUCTS CO., LTD., Kawasaki-Shi (JP)

( * ) Notice: Subject to any disclaimer, the term of this patent is extended or adjusted under 35 U.S.C. 154(b) by 311 days.

(21) Appl. No.: 14/118,534

(22) PCT Filed: May 15, 2012

(86) PCT No.: PCT/JP2012/062424
§ 371 (c)(1),
(2), (4) Date: Nov. 18, 2013

(87) PCT Pub. No.: WO2012/157648
PCT Pub. Date: Nov. 22, 2012

(65) Prior Publication Data
US 2014/0075984 A1 Mar. 20, 2014

(30) Foreign Application Priority Data
May 18, 2011 (JP) .................................. 2011-111322

(51) Int. Cl.
*F25J 1/00* (2006.01)
*B01D 5/00* (2006.01)
(Continued)

(52) U.S. Cl.
CPC ............ *F25J 1/0027* (2013.01); *B01D 5/006* (2013.01); *B01D 5/0072* (2013.01);
(Continued)

(58) Field of Classification Search
CPC .... F25J 1/0027; F25J 2210/80; F25J 2215/80; F25J 2220/80; F25J 2220/82;
(Continued)

(56) References Cited

U.S. PATENT DOCUMENTS

2007/0169794 A1\* 7/2007 Han ................... H01L 21/02071
134/94.1

FOREIGN PATENT DOCUMENTS

JP 2001-261320 A 9/2001
JP 2001261320 A \* 9/2001 ............. F25J 1/0027
(Continued)

OTHER PUBLICATIONS

Office Action received in Japanese Patent Application 2013-515169 mailed on Sep. 16, 2014.

*Primary Examiner* — Keith Raymond
(74) *Attorney, Agent, or Firm* — Knobbe Martens Olson & Bear LLP (57) ABSTRACT

A liquefied carbon dioxide producing apparatus that can generate high-purity liquid $CO_2$ free from moisture and organic matter such as oil includes: a recirculating system that carries out a recirculating treatment on $CO_2$; and an introduction device that introduces $CO_2$ from an external source of $CO_2$ into the recirculating system. The recirculating system includes at least an evaporator that vaporizes $CO_2$, a condenser that condenses $CO_2$ from an outlet of the evaporator, and a storage tank that stores liquid $CO_2$ generated by the condenser. The liquid $CO_2$ in the storage tank is fed to a point-of-use and to the evaporator. An adsorption device that removes moisture and organic matter (oil) is provided on a line from the external source of $CO_2$ to the condenser at a position where $CO_2$ gas flows.

3 Claims, 6 Drawing Sheets

(51) Int. Cl.
*B01D 53/04* (2006.01)
*C01B 31/20* (2006.01)

(52) U.S. Cl.
CPC ....... *B01D 5/0096* (2013.01); *B01D 53/0438* (2013.01); *B01D 53/0446* (2013.01); *C01B 31/20* (2013.01); *B01D 53/04* (2013.01); *B01D 2253/102* (2013.01); *B01D 2253/104* (2013.01); *B01D 2253/106* (2013.01); *B01D 2253/108* (2013.01); *B01D 2256/22* (2013.01); *B01D 2257/70* (2013.01); *B01D 2257/80* (2013.01); *B01D 2258/0216* (2013.01); *F17C 2221/013* (2013.01); *F17C 2221/05* (2013.01); *F25J 2210/80* (2013.01); *F25J 2215/80* (2013.01); *F25J 2220/80* (2013.01); *F25J 2220/82* (2013.01); *Y02P 20/152* (2015.11); *Y02P 70/34* (2015.11)

(58) Field of Classification Search
CPC .... B01D 5/006; B01D 5/0072; B01D 5/0096; B01D 53/02; B01D 53/04; B01D 53/0438; B01D 53/0446; B01D 2253/20; B01D 2256/22; B01D 2257/70–2257/80; B08B 7/0021
See application file for complete search history.

(56) References Cited

FOREIGN PATENT DOCUMENTS

| | | |
|---|---|---|
| JP | 2003-031533 A | 1/2003 |
| JP | 2006-326429 A | 12/2006 |
| JP | 2006-347842 A | 12/2006 |
| JP | 2010-254544 A | 11/2010 |

* cited by examiner

METHOD AND APPARATUS FOR PRODUCING HIGH-PURITY LIQUEFIED CARBON DIOXIDE

CROSS-REFERENCE TO RELATED APPLICATIONS

This application is the U.S. National Phase under 35. U.S.C. §371 of International Application PCT/JP2012/062424, filed May 15, 2012, which claims priority to Japanese Patent Application No. 2011-111322, filed May 18, 2011. The disclosures of the above-described applications are hereby incorporated by reference in their entirety. The International Application was published under PCT Article 21(2) in a language other than English.

TECHNICAL FIELD

The present invention relates to a method and apparatus for producing liquefied carbon dioxide (liquefied $CO_2$), and to a method and apparatus for producing liquefied carbon dioxide which method and apparatus enable ultrahigh purity liquefied $CO_2$ for use in manufacturing processes of electronic components including manufacture of semiconductor devices.

BACKGROUND ART

Many techniques for gas purification and purity improvement have been proposed for various gases. For purification of carbon dioxide ($CO_2$), diversified purification techniques for the respective purposes have been available ranging from such common techniques as recover and purify gas generated from an oil purification process to methods enabling high purification and intended for definite applications, for example, a semiconductor device manufacturing process.

With the recent rapid growth in semiconductor markets and the like, the following methods have been proposed: precision cleaning of optical components or microdevices using high purity liquefied $CO_2$, and cleaning and drying of semiconductor wafers using supercritical $CO_2$. Thus, applications of and demands for liquefied $CO_2$ have been increasing. Furthermore, these applications need liquefied $CO_2$ at a high quality level (for example, liquefied $CO_2$ with a very small amount of impurities).

A method for producing carbon dioxide which method provides an ever higher purification level is needed in order to obtain $CO_2$ with a high purity enough for use in a fine, nano-level, and precise process such as a semiconductor device manufacturing process. Furthermore, a process control method, a supply method, or an analysis technique is desired which allows such $CO_2$ to be stably supplied.

Figure 1:
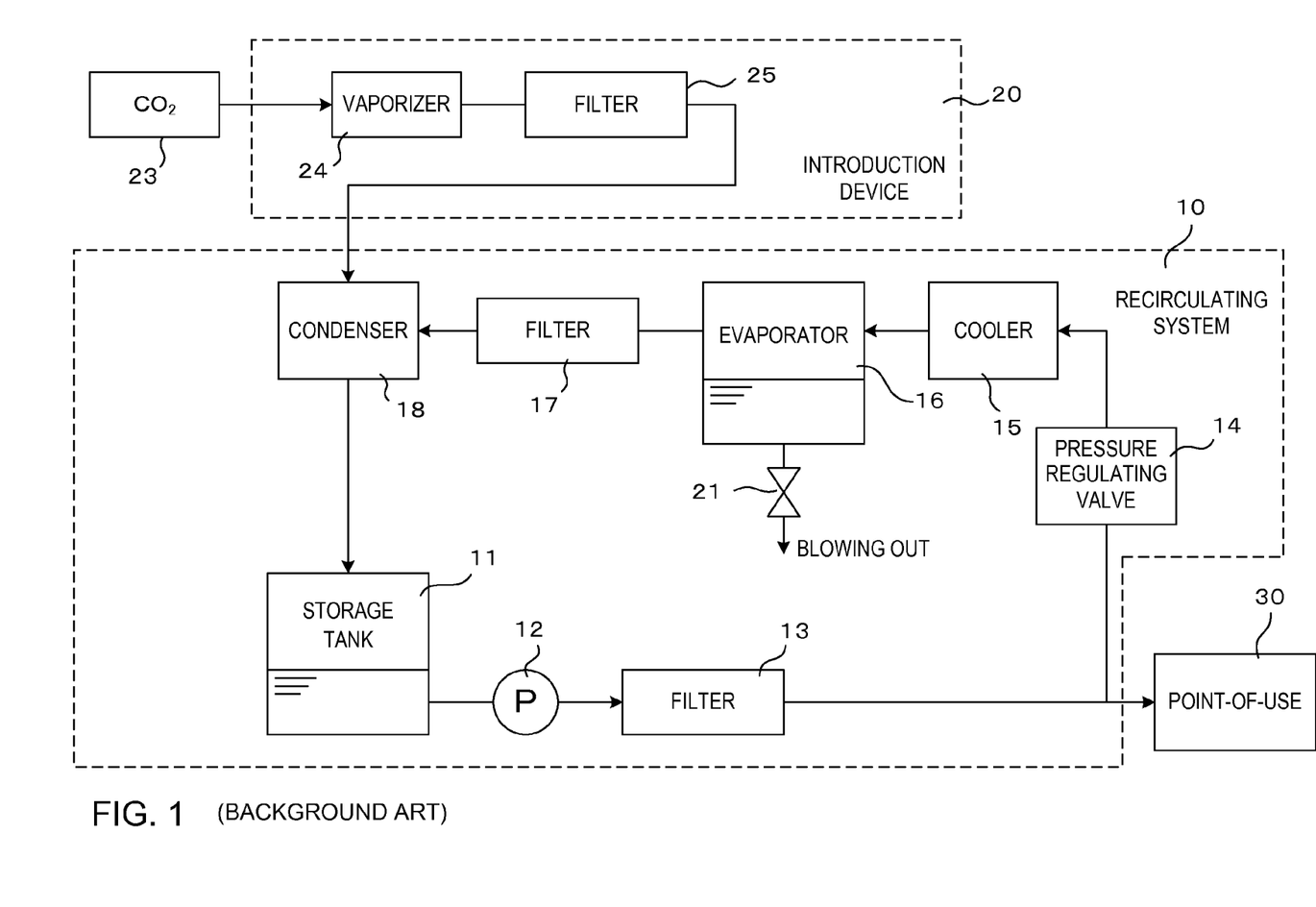
FIG. 1 is a diagram showing an example of a configuration of a conventional liquefied carbon dioxide producing apparatus of a recirculating purification type.

A liquefied carbon dioxide supply system of a recirculating purification type is an apparatus that stably supplies high-purity liquid $CO_2$ to a point-of-use. The liquefied carbon dioxide supply system of the recirculating purification type improves the purity of $CO_2$ by using a recirculating system that vaporizes liquid $CO_2$ into $CO_2$ gas and which condenses the $CO_2$ gas back into liquid $CO_2$, to circulate $CO_2$ through the recirculating system. Patent Literature 1 discloses a liquefied carbon dioxide supply system of a recirculating purification type. FIG. 1 illustrates an example of a configuration of a conventional liquefied carbon dioxide producing apparatus of a recirculating purification type which configured based on the description in JP-A-2006-326429 (Patent Literature 1).

A liquefied carbon dioxide producing apparatus shown in FIG. 1 includes: storage tank 11 that temporarily stores high-purity liquid $CO_2$; pump 12 provided at an outlet of storage tank 11 to pump the liquid $CO_2$; and filter 13 provided at an outlet of pump 12. Part of the liquid $CO_2$ flowing out from filter 13 is supplied to point-of-use 30 in a branching manner, with the remaining liquid $CO_2$ fed to cooler 15 via pressure regulating valve 14. Pressure regulating valve 14 is provided to regulate the pressure of liquid $CO_2$ to be supplied to point-of-use 30 to a specified pressure value. Liquid $CO_2$ supplied to and cooled by cooler 15 is then supplied to evaporator 16 for gas-liquid separation. Evaporator 16 incorporates a heater to form a gas-liquid interface of $CO_2$ therein. The $CO_2$ in a liquid state supplied to evaporator 16 is vaporized with refractory particles (particulates) remaining on a liquid phase side. The $CO_2$ gas purified by vaporization in evaporator 16 is fed from a gaseous phase side outlet of evaporator 16 to condenser 18 via filter 17 for further removing particles. The $CO_2$ gas is then cooled and liquefied again by condenser 18, and returned to storage tank 11 as liquid $CO_2$. In this arrangement, $CO_2$ recirculating system 10 comprises storage tank 11, pump 12, filter 13, pressure regulating valve 14, cooler 15, evaporator 16, filter 17, and condenser 18. A recirculating treatment is carried out on liquid $CO_2$ not used at point-of-use 30. Particles having shifted to the liquid phase in evaporator 16 are discharged (blown out) to the exterior by opening valve 21 provided at a liquid phase side outlet of evaporator 16. Filter 13 is provided because pump might generate dusts.

Introduction device 20 that supplies $CO_2$ to recirculating system 10 uses a liquefied carbon dioxide cylinder or a cold evaporator (CE) as liquid $CO_2$ source 23 to function $CO_2$ introduction means. Introduction device 20 includes vaporizer 24 that vaporizes liquid $CO_2$ from liquid $CO_2$ source 23, and filter 25 that removes particles from the $CO_2$ gas vaporized by vaporizer 24. Introducing the $CO_2$ gas having passed through filter 25 into condenser 18 allows $CO_2$ to be supplied to recirculating system 10.

$CO_2$ from a commonly available $CO_2$ source contains not a small amount of particles whether the $CO_2$ is in a gaseous state or a liquid state. Liquid $CO_2$ commonly distributed for industrial use contains a particularly large amount of particles. When $CO_2$ used for cleaning, drying, or the like is recovered and purified, the recovered $CO_2$ contains a large amount of particles. Since such a $CO_2$ source is used, the particles are removed by passing gaseous $CO_2$ flowing out from vaporizer 24 through filter 25. At this time, the particles attach to and accumulate on an inner surface of vaporizer 24. However, the particles cannot completely be removed only by vaporizer 24 and filter 25, and the particles may enter recirculating system 10 through introduction device 20 together with $CO_2$. In recirculating system 10, evaporator 16 and filters 13 and 17 remove particles having failed to be removed by introduction device 20 and particles generated in pump 12 and piping. Thus, the method for producing liquefied carbon dioxide according to Patent Literature 1 can prevent particles from being mixed into high-purity liquid $CO_2$ thus purified.

JP-A-2006-347842 (Patent Literature 2) discloses a method for producing high-purity liquid $CO_2$, the method including: vaporizing liquid $CO_2$ in a vaporizer; passing the vaporized $CO_2$ through a dehumidifier and an activated carbon filter, and then purifying and liquefying the resultant $CO_2$ in a rectifier again to obtain liquid $CO_2$ with an improved purity. According to this method, high-purity liquid $CO_2$ is produced off-site and filled into a high-pressure container such as a cylinder, and the high-pressure container is transported to a point-of-use, where the high-purity liquid $CO_2$ is taken out of the high-pressure container for use. Thus, the method described in Patent Literature 2 needs a high-pressure container dedicated to high-purity liquid $CO_2$ and needs to handle such high-purity $CO_2$ separately from normal-purity $CO_2$. This makes management complicated and expensive.

CITATION LIST

Patent Literature(s)

Patent Literature 1: JP-A-2006-326429
Patent Literature 2: JP-A-2006-347842

SUMMARY OF INVENTION

Technical Problem to be Solved by the Invention

Several proposals have been made for $CO_2$ purification techniques intended to be applied to semiconductor device manufacturing processes. However, no method for producing, managing, and supplying high-purity $CO_2$ is known in which even moisture, oil, and the number of particles in produced high-purity $CO_2$ are managed. The oil refers to various types of organic matter that are difficult to remove by a filter intended for $CO_2$ in a gaseous phase.

An object of the present invention is to provide a method for producing liquefied carbon dioxide which method is suitable for producing high-purity liquid $CO_2$ on-site and which enables an easy reduction in the number of particles and the amount of moisture and organic matter in the liquid $CO_2$.

Another object of the present invention is to provide a liquefied carbon dioxide producing apparatus which is suitable for producing high-purity liquid $CO_2$ on-site and which enables an easy reduction in the number of particles and the amount of moisture and organic matter in the liquid $CO_2$.

Solution to the Problem

A liquefied carbon dioxide producing apparatus according to the present invention supplies carbon dioxide in a liquid state to a destination and includes: a recirculating system including at least a storage tank that stores carbon dioxide in the liquid state, an evaporator that vaporizes carbon dioxide, a condenser that condenses carbon dioxide in a gaseous phase flowing out through an outlet of the evaporator to generate carbon dioxide in the liquid state, a supply line through which the carbon dioxide in the liquid state in the storage tank is supplied to the destination, a recirculating line which branches from the supply line and through which part or all of the carbon dioxide in the liquid state is fed to the evaporator, and a return line through which the carbon dioxide in the liquid state generated by the condenser is fed to the storage tank, and introduction means for receiving a supply of carbon dioxide from an external source of liquid carbon dioxide and introducing the carbon dioxide in a gaseous state, the liquid state, or a gas-liquid mixed state into the recirculating system, wherein an adsorption device is provided on a line from the source of liquid carbon dioxide to the condenser at a position where the carbon dioxide flows in the gaseous phase, the adsorption device removing at least one of moisture and organic matter from the carbon dioxide in the gaseous phase flowing through the position.

A method for producing liquefied carbon dioxide according to the present invention carries out a recirculating treatment to supply carbon dioxide in a liquid state to a destination, and includes: a step of, in a recirculating system that carries out the recirculating treatment, condensing, by a condenser, carbon dioxide in a gaseous state flowing out through an outlet of an evaporator that vaporizes the carbon dioxide, to store the carbon dioxide in a liquid state in a storage tank; a step of supplying the carbon dioxide in the liquid state from the storage tank to an evaporator via a recirculating line branching from a supply line that is connected to the storage tank in order to supply the carbon dioxide in the liquid state to the destination; an introduction step of receiving a supply of carbon dioxide from an external source of liquid carbon dioxide and introducing the carbon dioxide in a gaseous state, the liquid state, or a gas-liquid mixed state into the recirculating system; and an impurity removal step of removing at least one of moisture and organic matter from the carbon dioxide flowing in a gaseous phase, at a position on a line from the source of liquid carbon dioxide to the condenser.

The present invention allows moisture and organic matter derived from the liquid $CO_2$ source to be adsorbed and removed, and reduces the amount of particles in the carbon dioxide in the gaseous state flowing out through the outlet of the evaporator, thus allowing a point-of-use or the like to be stably supplied with high-purity liquid $CO_2$ with not only the particles but also impurities such as the moisture and organic matter significantly removed therefrom.

DESCRIPTION OF THE EMBODIMENTS

A liquefied carbon dioxide producing apparatus based on the present invention can be configured similarly to a liquefied carbon dioxide producing apparatus of a recirculating purification type shown in FIG. 1 but is characterized by including an adsorption device provided on a line from a source of liquid $CO_2$ to a condenser at a position where $CO_2$ flows in a gaseous phase so that the adsorption device removes at least one of moisture and organic matter from $CO_2$ gas. The adsorption device includes an adsorbent that adsorbs the at least one of the moisture and the organic matter.

When moisture or organic matter typified by oil is brought into a recirculating system for high-purity $CO_2$, the moisture or organic matter is difficult to remove by a filter or the like and thus becomes impurities in liquid $CO_2$ supplied to a point-of-use. Removal of the moisture or organic matter by the adsorption device allows high-purity liquid $CO_2$ to be stably supplied to the point-of-use. Since $CO_2$ in a vaporized state is passed through the adsorption device, the performance of the adsorbent filled in the adsorption device can be maximized. Furthermore, an adsorption treatment carried out on $CO_2$ in a gaseous state serves to reduce elution from the adsorbent and the discharge of particles from the adsorption device itself.

The adsorption device may be, for example, an adsorption column filled with an adsorbent for moisture removal or for organic matter (oil) removal. In this case, an adsorption column for moisture removal and an adsorption column for organic matter removal may be separately provided and connected together in series. Alternatively, a single adsorption column may be filled with an adsorbent suitable for moisture removal and an adsorbent suitable for organic matter removal. What source of liquid $CO_2$ is used determines the type of the organic matter and the amounts of moisture and organic matter contained in the source of liquid $CO_2$, and thus, the adsorbent is preferably selected according to the source of liquid $CO_2$. Well-known adsorbents such as zeolite, molecular sieves, activated alumina, and silica gel may be used as the adsorbent for moisture removal. A well-known adsorbent such as activated carbon may be used as the adsorbent for organic matter removal. Dry gas with moisture therein sufficiently reduced in a controllable manner is preferably passed through these adsorbents to remove moisture from the adsorbents regardless of whether each of the adsorbents is for moisture removal or for organic matter removal.

The source of liquid $CO_2$ may be stored in a cylinder or a cold evaporator. Alternatively, the source of liquid $CO_2$ may be recovered $CO_2$ obtained by recovering $CO_2$ which has been used at the point-of-use. Commercially available liquid $CO_2$ which has a certain degree of purity and which is relatively inexpensive is food $CO_2$, that is, $CO_2$ produced in accordance with standards for $CO_2$ as a food additive. However, the food $CO_2$ contains small amounts of moisture and organic matter. The liquefied carbon dioxide producing apparatus based on the present invention includes the adsorption device as described above and can generate high-purity liquid $CO_2$ applicable to, for example, a semiconductor device manufacturing process by using food $CO_2$ as an external source of liquid $CO_2$.

An evaporator provided in the recirculating system may provide a function to simply vaporize liquid $CO_2$. Alternatively, the evaporator may be a gas-liquid separator having a gas-liquid interface formed inside and providing a function to vaporize liquid $CO_2$ and to shift refractory particles (particulates) contained in the liquid $CO_2$ to a liquid phase side. The use of an evaporator that is a gas-liquid separator allows the liquid phase content to be purged (discharged) as necessary to discharge the particles out of the system.

Figure 2:
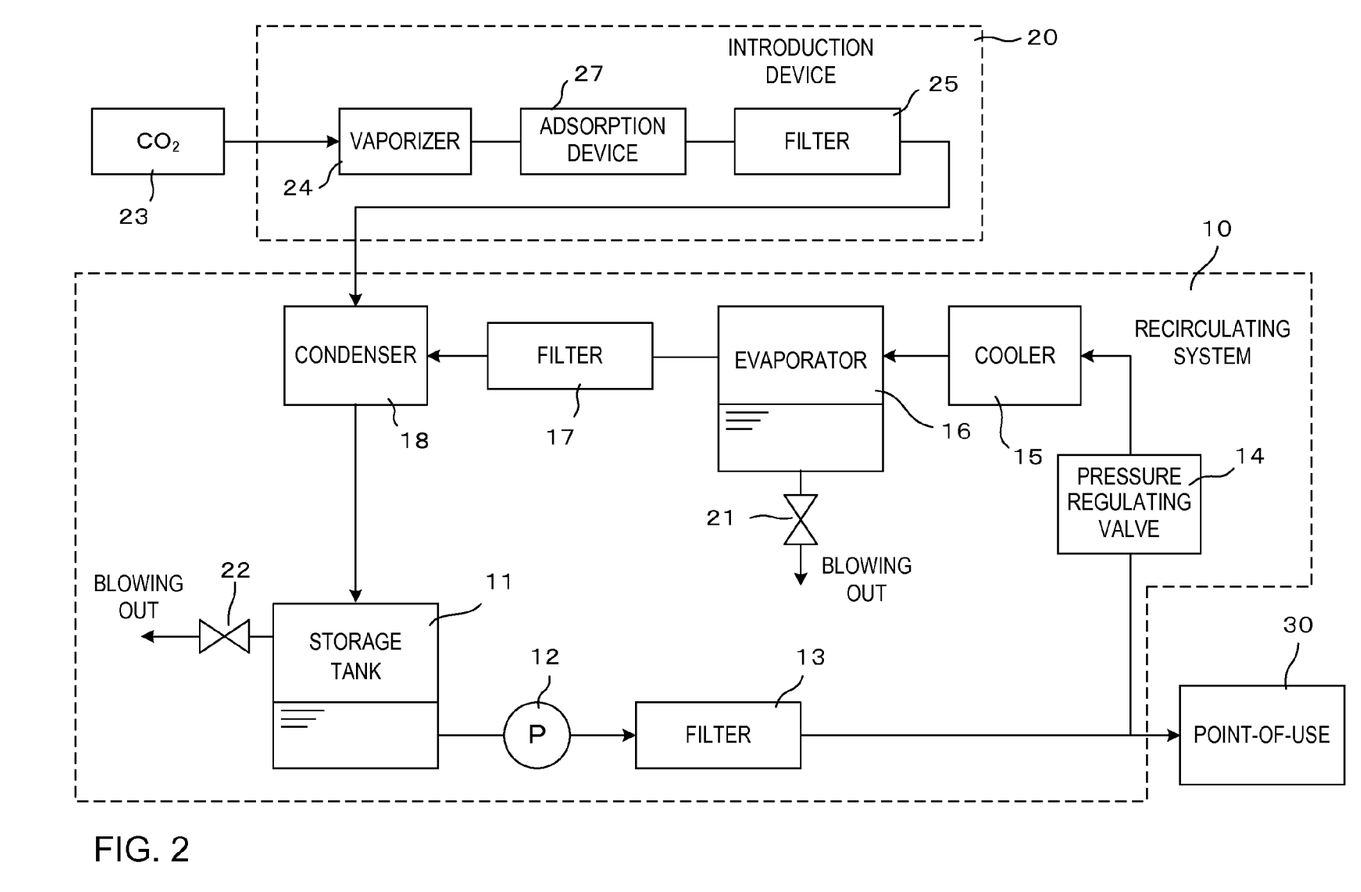
FIG. 2 is a diagram showing a configuration of a liquefied carbon dioxide producing apparatus according to an embodiment of the present invention.

FIG. 2 is a diagram showing a configuration of a liquefied carbon dioxide producing apparatus according to an embodiment of the present invention. The liquefied carbon dioxide producing apparatus shown in FIG. 2 is configured similarly to the liquefied carbon dioxide producing apparatus shown in FIG. 1, supplies liquid $CO_2$ (carbon dioxide) to point-of-use 30, and generally includes recirculating system 10 and introduction device 20.

Recirculating system 10 is configured identically to the recirculating system shown in FIG. 1. That is, recirculating system 10 includes storage tank 11 that temporarily stores high-purity liquid $CO_2$, pump 12 provided at an outlet of storage tank 11, filter 13 provided at an outlet of pump 12, pressure regulating valve 14 for regulating the pressure of liquid $CO_2$ to be supplied to point-of-use 30, cooler 15 that cools liquid $CO_2$ flowing out from pressure regulating valve 14, evaporator 16 that carries out gas-liquid separation on the liquid $CO_2$ flowing out from cooler 15, filter 17 connected to outlet of evaporator 16, and condenser 18 that condenses gaseous $CO_2$ flowing out from filter 17 so that the $CO_2$ liquefied by condenser 18 is returned to storage tank 11. Liquid $CO_2$ from an outlet of filter 13 is supplied to point-of-use 30 in such a manner as to branch from recirculating system 10, and the remaining liquid $CO_2$ not used at point-of-use 30 is fed to pressure regulating valve 14. Storage tank 11 also includes valve 22 configured to forcibly discharge (blow out) other low-boiling point components (for example, air) and the like which are present therein as impurity components to the exterior. Cooler 15 need not be provided. However, to allow gas-liquid separation to be precisely performed in evaporator 16, liquefaction into liquid $CO_2$ is preferably reliably achieved, and for that purpose, cooler 15 is preferably provided.

In the configuration shown in FIG. 2, a line from storage tank 11 through pump 12 and filter 13 to point-of-use 30 is a supply line through which liquid $CO_2$ is supplied to point-of-use 30. A line branching from the supply line and extending to an inlet of evaporator 16 via pressure regulating valve 14 is a recirculating line for liquid $CO_2$. Furthermore, a line from condenser 18 to storage tank 11 is a return line for liquid $CO_2$.

In the recirculating system, an evaporator with a gas-liquid interface of $CO_2$ formed inside (that is, a gas-liquid separator) can be used as evaporator 16. Pressure regulating valve 14 is provided to regulate the pressure of liquid $CO_2$ to be supplied to point-of-use 30 to a specified pressure value. However, pressure regulating valve 14 need not necessarily be provided depending on, for example, the range of supply pressures or supply speeds needed for point-of-use 30.

Introduction device 20 functions as introduction means that receives a supply of carbon dioxide from an external source of liquid carbon dioxide and introduces the carbon dioxide into recirculating system 10. Introduction device 20 includes vaporizer 24 that vaporizes liquid $CO_2$ from liquid $CO_2$ source 23, adsorption device 27 that removes moisture and organic matter from $CO_2$ gas fed from vaporizer 24, and filter 25 that removes particles from the $CO_2$ gas flowing out from adsorption device 27. The $CO_2$ gas from filter 25 is supplied to condenser 18 in recirculating system 10. As described above, adsorption device 27 is used which includes an adsorbent for moisture removal and an adsorbent for organic matter (oil) removal.

In this configuration, liquid $CO_2$ from liquid $CO_2$ source 23 is vaporized by vaporizer 24, and thus, even when the liquid $CO_2$ contains moisture or organic matter, the moisture or organic matter is adsorbed and removed by adsorption device 27. Furthermore, adsorption device 27 may generate particles resulting from the adsorbent. However, the particles generated by adsorption device 27 are removed by filter 25 along with particles derived from liquid $CO_2$ source 23, and particles having failed to be removed by filter 25 are removed by evaporator 16 and filter 17. Thus, moisture, organic matter, and particles are prevented from being fed to point-of-use 30. For example, refractory particles or particles which have a low vapor pressure and which are thus likely to be dispersed or dissolved into liquid $CO_2$ are shifted to the liquid phase side in evaporator 16 and thus removed from the $CO_2$ given that the evaporator has a gas-liquid separation function. The particles having shifted to the liquid phase side in evaporator 16 can be discharged (purged) to the exterior of recirculating system 10 by opening valve 21 provided at the liquid phase side of evaporator 16. In particular, in this configuration, even while an operation of circulating $CO_2$ through recirculating system 10 is being performed, the particles can be discharged to the exterior of the system by opening valve 21 at an appropriate timing. Thus, loads on whole recirculating system 10 and on downstream filters 13 and 17 can be reduced, allowing high-quality liquid $CO_2$ to be stably obtained and enabling a reduction in the frequency of maintenance work for the whole liquefied carbon dioxide producing apparatus. Particles remaining in the gas phase can be removed by filter 17 connected to the outlet of evaporator 16. Filter 17 carries out a filter treatment on $CO_2$ in a gaseous phase and thus exhibits high separation removal efficiency.

Figure 3:
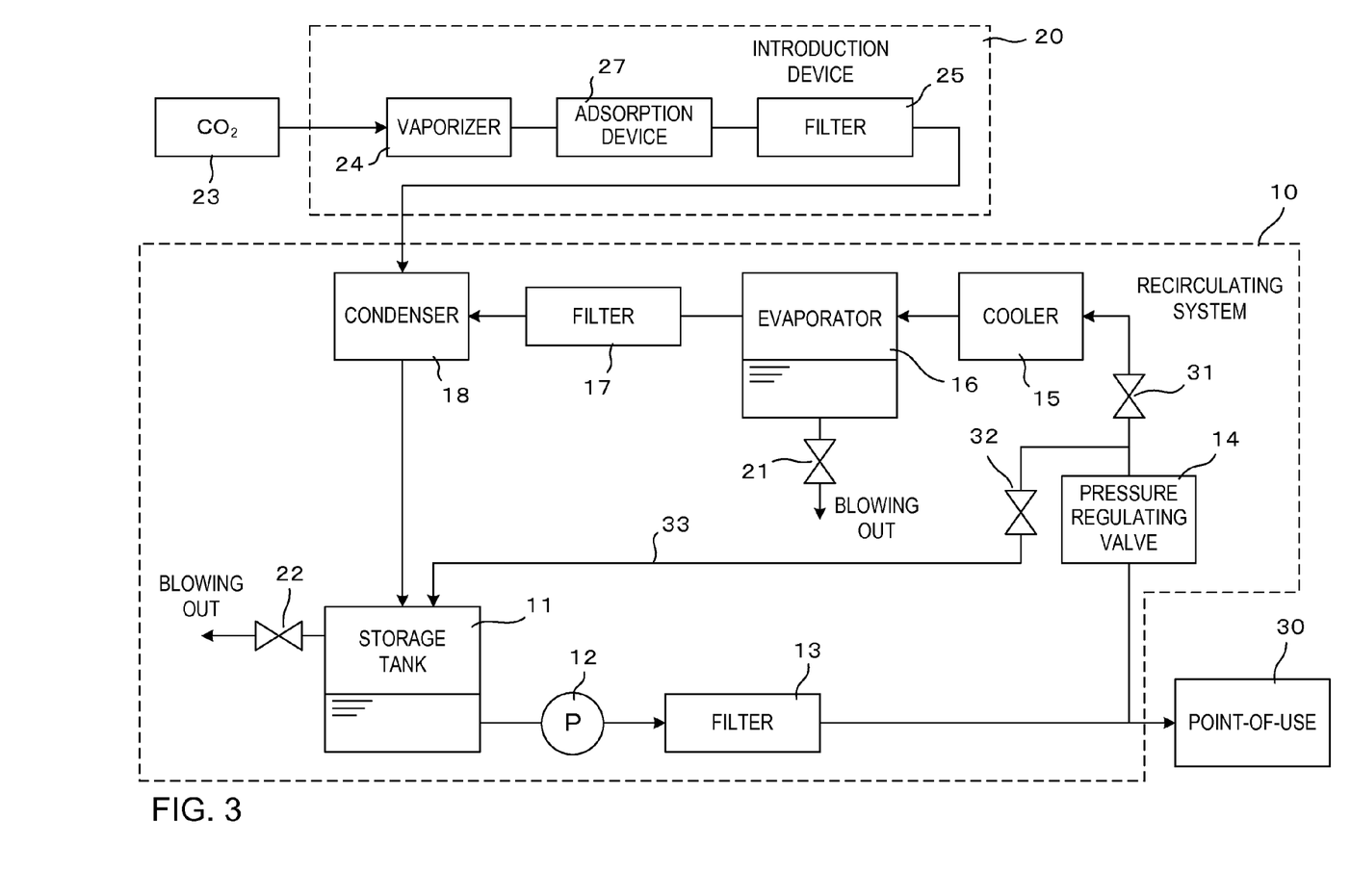
FIG. 3 is a diagram showing a configuration of a liquefied carbon dioxide producing apparatus including a bypass line.

The liquefied carbon dioxide producing apparatus according to the present embodiment may include a bypass line that allows purified $CO_2$ to be returned from the supply line to storage tank 11 without passing through cooler 15 and evaporator 16. FIG. 3 shows a liquefied carbon dioxide producing apparatus including a bypass line. In the recirculating line, valve 31 is provided on a pipe connecting pressure regulating valve 14 and cooler 15 together. Bypass line 33 branches from a position between pressure regulating valve 14 and valve 31, with a leading end of bypass line 33 connected directly to storage tank 11. Bypass line 33 includes valve 32 cooperating with valve 31 in functioning as a selector valve.

In a liquefied carbon dioxide producing apparatus shown in FIG. 3, during the initial period of operation, valve 31 is opened and valve 32 is closed to circulate $CO_2$ through recirculating system 10 so that the $CO_2$ flows through evaporator 16 and condenser 18, thus generating high-purity $CO_2$. When high-purity $CO_2$ is sufficiently generated and starts to circulate through recirculating system 10, for example, when the purity of $CO_2$ in recirculating system 10 has reached a predetermined level, valve 31 is closed and valve 32 is opened to circulate $CO_2$ through recirculating system 10 while preventing the $CO_2$ from passing through evaporator 16 and condenser 18. In some cases, both valve 31 and valve 32 may be half opened to allow part of the liquid $CO_2$ flowing out from pressure regulating valve 14 to flow through bypass line 33 while allowing the remaining liquid $CO_2$ to be supplied to evaporator 16. After high-purity $CO_2$ is generated by passing $CO_2$ through evaporator 16 and condenser 18, the high-purity $CO_2$ need not be passed through evaporator 16 and condenser 18 again. This eliminates the need for energy otherwise needed for the treatment in evaporator 16 and condenser 18, allowing energy consumption to be suppressed.

Figure 4:
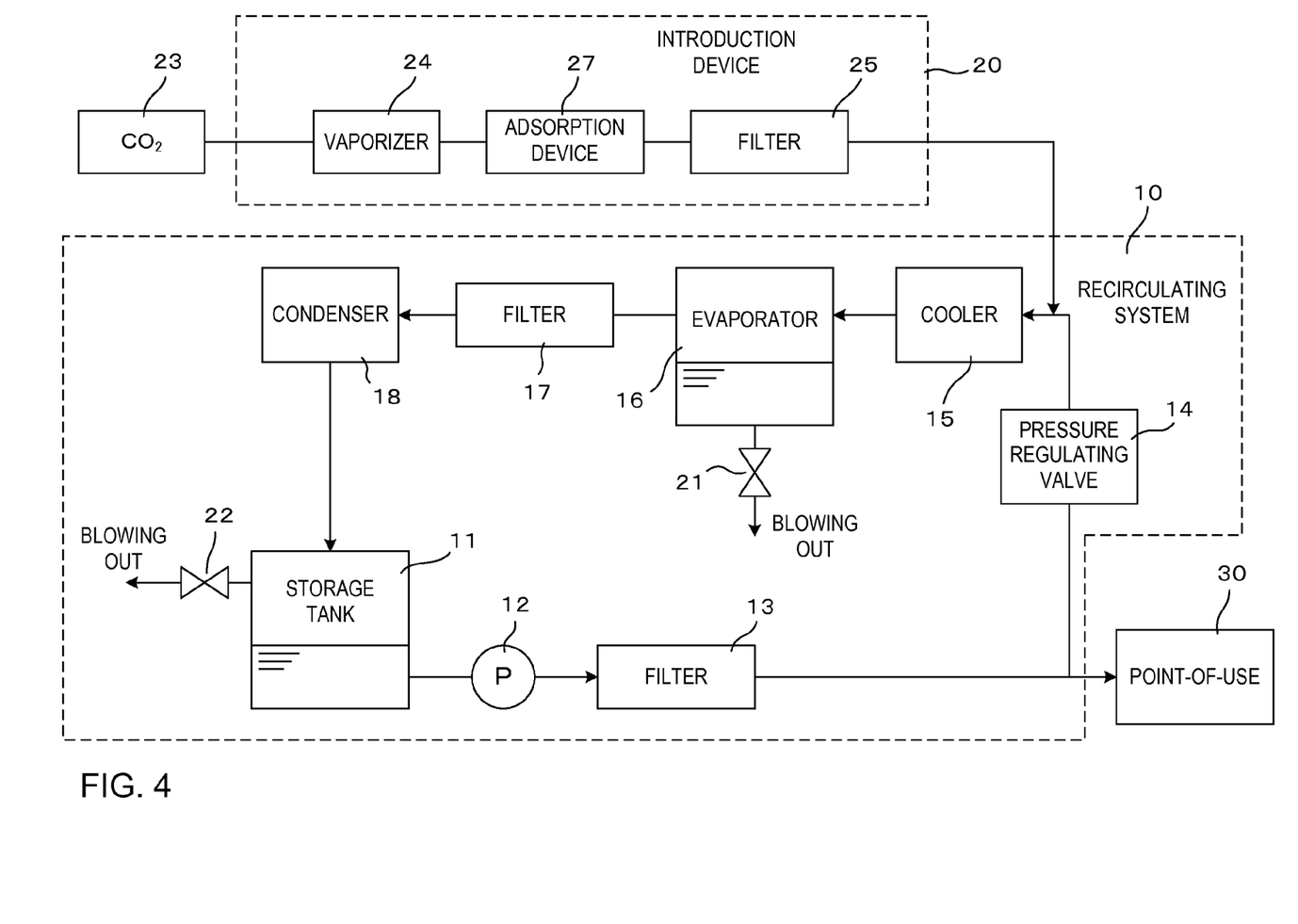
FIG. 4 is a diagram showing a configuration of a liquefied carbon dioxide producing apparatus according to another embodiment.

FIG. 4 is a diagram showing a liquefied carbon dioxide producing apparatus according to another embodiment of the present invention. A liquefied carbon dioxide producing apparatus shown in FIG. 4 is different from the liquefied carbon dioxide producing apparatus shown in FIG. 2 in a position where $CO_2$ gas from introduction device 20 is introduced into recirculating system 10. In the liquefied carbon dioxide producing apparatus shown in FIG. 4, $CO_2$ gas from introduction device 20 is supplied to an inlet side of cooler 15 in the recirculating line. The supplied $CO_2$ gas is mixed with liquid $CO_2$ from pressure regulating valve 14 and liquefied in cooler 15, and the liquefied $CO_2$ is fed to evaporator 16 with a gas-liquid separation function. In this configuration, $CO_2$ from liquid $CO_2$ source 23 is invariably subjected to a gas-liquid separation treatment in evaporator 16, and thus, particles are more reliably removed. Even with a source of liquid $CO_2$ with a large number of particles, high-purity liquid $CO_2$ with a reduced number of particles can be supplied to point-of-use 30.

Even the liquefied carbon dioxide producing apparatus shown in FIG. 4 may include a bypass line through which purified $CO_2$ is returned from the recirculating line to storage tank 11 without passing through cooler 15 and evaporator 16. Provision of the bypass line allows energy consumption to be suppressed because once high-purity $CO_2$ is generated by passing $CO_2$ through evaporator 16 and condenser 18, the high-purity $CO_2$ need not be passed through evaporator 16 and condenser 18 again.

Figure 5:
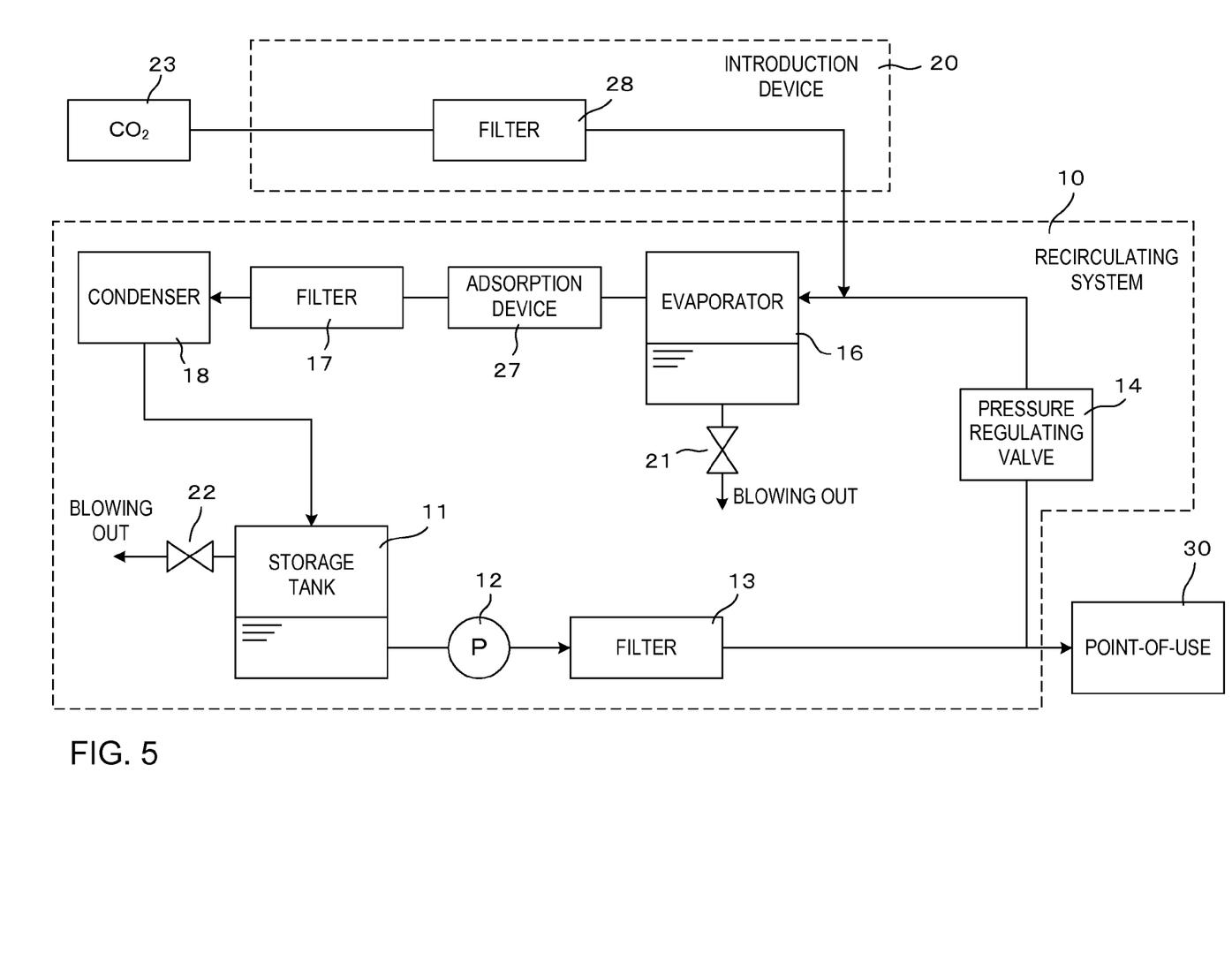
FIG. 5 is a diagram showing a configuration of a liquefied carbon dioxide producing apparatus according to yet another embodiment.

FIG. 5 is a diagram showing a liquefied carbon dioxide producing apparatus according to yet another embodiment of the present invention. The liquefied carbon dioxide producing apparatus shown in FIG. 5 is similar to the liquefied carbon dioxide producing apparatus shown in FIG. 2 except that adsorption device 27 is not provided in introduction device 20 but in recirculating system 10, that the vaporizer is not provided inside introduction device 20 and $CO_2$ from the liquid $CO_2$ source is introduced into recirculating system 10 on the inlet side of evaporator 16, and that no cooler is provided.

The liquefied carbon dioxide producing apparatus shown in FIG. 5 includes no vaporizer, and thus, in introduction device 20, liquid $CO_2$ from liquid $CO_2$ source 23 is supplied directly to filter 28 that removes particles from the liquid $CO_2$. Liquid $CO_2$ flowing out from filter 28 is supplied to recirculating system 10. A position in recirculating system 10 where liquid $CO_2$ is supplied to recirculating system 10 is on a pipe from the outlet of pressure regulating valve 14 to the inlet of evaporator 16 or at the inlet of evaporator 16. That is, liquid $CO_2$ from pressure regulating valve 14 and liquid $CO_2$ from introduction device 20 are joined together so that the resultant liquid $CO_2$ is supplied to evaporator 16. However, part or all of the $CO_2$ fed from introduction device 20 to recirculating system 10 may be vaporized at the position where the $CO_2$ is introduced into recirculating system 10, depending on a piping length in introduction device 20, ambient temperature, or the like. In recirculating system 10, adsorption device 27 is provided between the outlet of evaporator 16 and filter 17. Adsorption device 27 may be similar to the above-described adsorption device.

Also in this configuration, adsorption device 27 is provided on a line from liquid $CO_2$ source 23 to condenser 18 at the position where $CO_2$ gas flows. Even if the liquid $CO_2$ from the liquid $CO_2$ source contains moisture or organic matter, the moisture or organic matter is adsorbed and removed by adsorption device 27. Furthermore, even if $CO_2$ fed from introduction device 20 to recirculating system 10 contains particles or other refractory substances, the particles or other refractory substances are removed from the $CO_2$ by evaporator 16 and filter 17. When evaporator 16 is used which has a gas-liquid interface formed inside, even impurities having an affinity for $CO_2$ in the liquid phase rather than for $CO_2$ in the gaseous phase and more easily dissolved into the liquid $CO_2$ side are removed by evaporator 16 from $CO_2$ circulating through recirculating system 10. Even when adsorption device 27 itself generates particles, the particles are removed by filter 17. Thus, moisture, organic matter, and particles are prevented from being fed to point-of-use 30.

In the liquefied carbon dioxide producing apparatus shown in FIG. 5, if the pressure of liquid $CO_2$ from liquid $CO_2$ source 23 is not sufficiently higher than the internal pressure of evaporator 16, the liquid $CO_2$ may fail to be appropriately introduced from introduction device 20 into recirculating system 10. In such a case, for example, a pump that pumps liquid $CO_2$ may be disposed between liquid $CO_2$ source 23 and filter 28. To allow the particles in recirculating system 10 to be shifted to the liquid phase side in evaporator 16, $CO_2$ is preferably supplied to evaporator 16 in a completely liquid state. Part of the $CO_2$ flowing out from the outlet of pressure regulating valve 14 may be vaporized depending on an operating condition or the like. In such a case, to ensure that the $CO_2$ is supplied to evaporator 16 in the liquid state, a cooler may be provided which cools $CO_2$ flowing between pressure regulating valve 14 and the inlet of evaporator 16 so that liquid $CO_2$ from introduction device 20 is introduced between the outlet of the cooler and the outlet of evaporator 16. Furthermore, the $CO_2$ from introduction device 20 is preferably supplied to evaporator 16 in a completely liquid state, and may be introduced into the recirculating system at a position upstream of cooler 15. When supercritical $CO_2$ is to be supplied to point-of-use 30, the pressure set for pressure regulating valve 14 may be set equal to or higher than the critical pressure of $CO_2$, and a heater may be installed between pump 12 and point-of-use 30 to raise the temperature of the $CO_2$ to a value equal to or higher than the critical temperature of $CO_2$.

Like the liquefied carbon dioxide producing apparatus shown in FIG. 3, the liquefied carbon dioxide producing apparatus shown in FIG. 5 may also include a bypass line that allows purified $CO_2$ to be returned from the recirculating line to storage tank 11 without passing through cooler 15 and evaporator 16. With the bypass line, once high-purity $CO_2$ is generated by passing $CO_2$ through evaporator 16 and condenser 18, the high-purity $CO_2$ need not be passed through evaporator 16 and condenser 18 again. This allows energy consumption to be suppressed.

Figure 6:
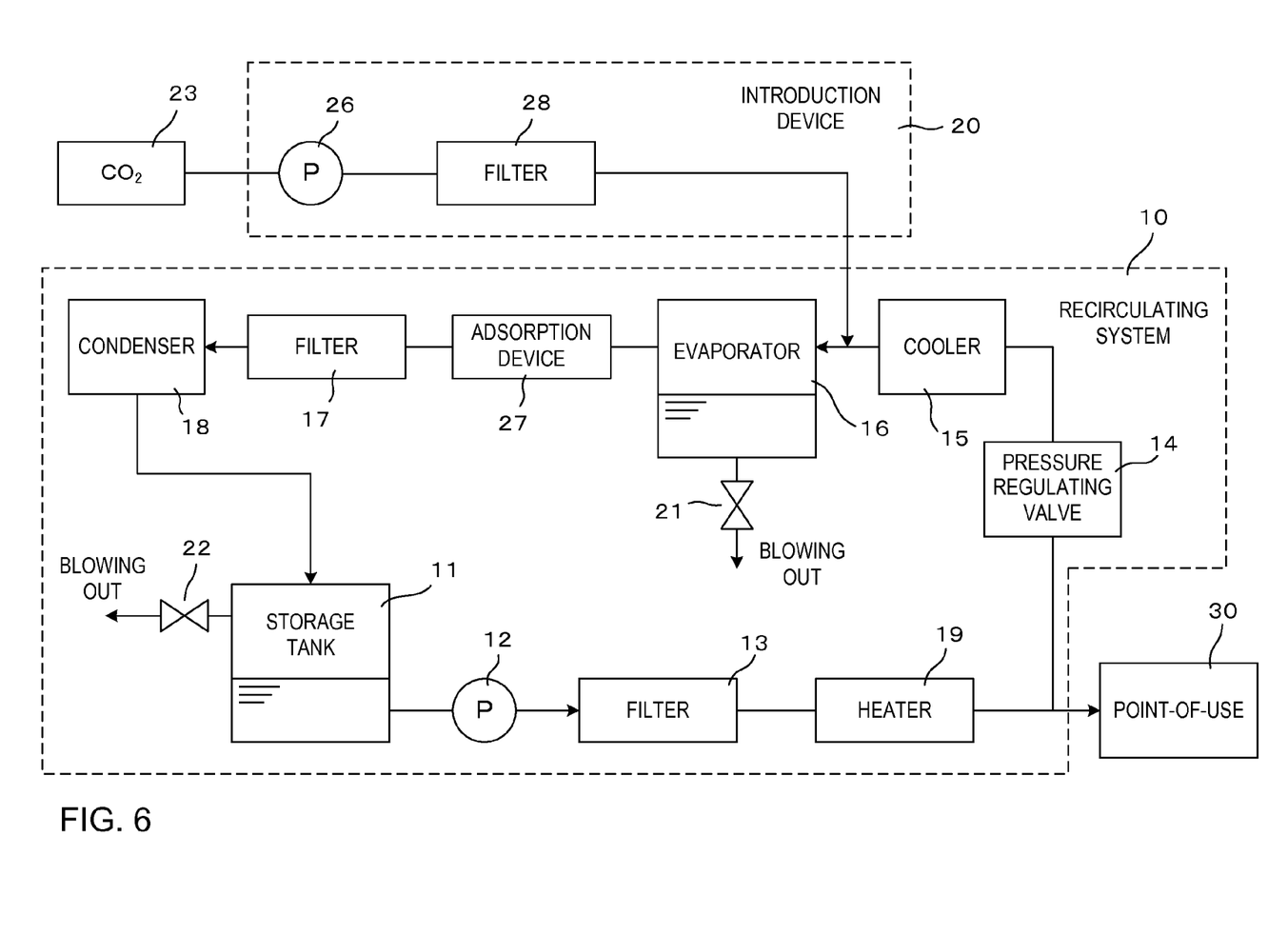
FIG. 6 is a diagram showing a configuration of a liquefied carbon dioxide producing apparatus according to still another embodiment.

Compared to the liquefied carbon dioxide producing apparatus shown in FIG. 5, a liquefied carbon dioxide producing apparatus shown in FIG. 6 includes cooler 15 provided between pressure regulating valve 14 and the inlet of evaporator 16, heater 19 provided at the outlet of filter 13 in order to supply supercritical $CO_2$ to point-of-use 30, and pump 26 provided between liquid $CO_2$ source 23 and filter 28 in order to increase the pressure of liquid $CO_2$ in introduction device 20. Cooler 15, heater 19, and pump 26 may be provided independently of one another as necessary.

Like the liquefied carbon dioxide producing apparatus shown in FIG. 3, the liquefied carbon dioxide producing apparatus shown in FIG. 6 may also include a bypass line that allows purified $CO_2$ to be returned to storage tank 11 through the recirculating system without passing through cooler 15 and evaporator 16. With the bypass line, once high-purity $CO_2$ is generated by passing $CO_2$ through evaporator 16 and condenser 18, the high-purity $CO_2$ need not be passed through evaporator 16 and condenser 18 again. This allows energy consumption to be suppressed.

EXPLANATION OF THE REFERENCE SIGNS

10 Recirculating system
11 Storage tank
12, 26 Pump
13, 17, 25, 28 Filter
14 Pressure regulating valve
15 Cooler
16 Evaporator
18 Condenser
19 Heater
20 Introduction device
21, 22, 31, 32 Valve
23 Liquid $CO_2$ source
24 Vaporizer
27 Adsorption device
30 Point-of-use
33 Bypass line

What is claimed is:

1. A liquefied carbon dioxide producing apparatus that supplies carbon dioxide in a liquid state to a destination, the apparatus comprising:

a recirculating system comprising at least a storage tank that stores carbon dioxide in the liquid state, an evaporator that vaporizes carbon dioxide, a condenser that condenses carbon dioxide in a gaseous phase flowing out through an outlet of said evaporator to generate carbon dioxide in the liquid state, a supply line through which the carbon dioxide in the liquid state in said storage tank is supplied to the destination, a recirculating line which branches from said supply line and through which part or all of the carbon dioxide in the liquid state is fed to said evaporator via a pressure regulating valve, and a return line through which the carbon dioxide in the liquid state generated by said condenser is fed to said storage tank; and introduction means for receiving a supply of carbon dioxide from an external source of liquid carbon dioxide and introducing the carbon dioxide in a gaseous state, the liquid state, or a gas-liquid mixed state into said recirculating system, wherein an adsorption device is provided on a line from the source of liquid carbon dioxide to said condenser at a position where the carbon dioxide flows in the gaseous phase, said adsorption device removing at least one of moisture and organic matter from the carbon dioxide in the gaseous phase flowing through the position, wherein, in said recirculating system, said adsorption device is provided on a line between the outlet of said evaporator and an inlet of said condenser, and wherein said introduction means introduces carbon dioxide in the liquid state on said recirculating line of at an inlet of said evaporator, and a filter disposed between an outlet of said adsorption device and said condenser to carry out a filter treatment.

2. The liquefied carbon dioxide producing apparatus according to claim 1, wherein said evaporator is a gas-liquid separator with a gas-liquid interface of carbon dioxide formed inside.

3. The liquefied carbon dioxide producing apparatus according to claim 2, comprising a cooler that cools carbon dioxide flowing through said recirculating line.

* * * * *